Sept. 19, 1967  G. FELSENFELD  3,342,695
EXPONENTIAL FEED METHOD AND APPARATUS
Filed July 14, 1964
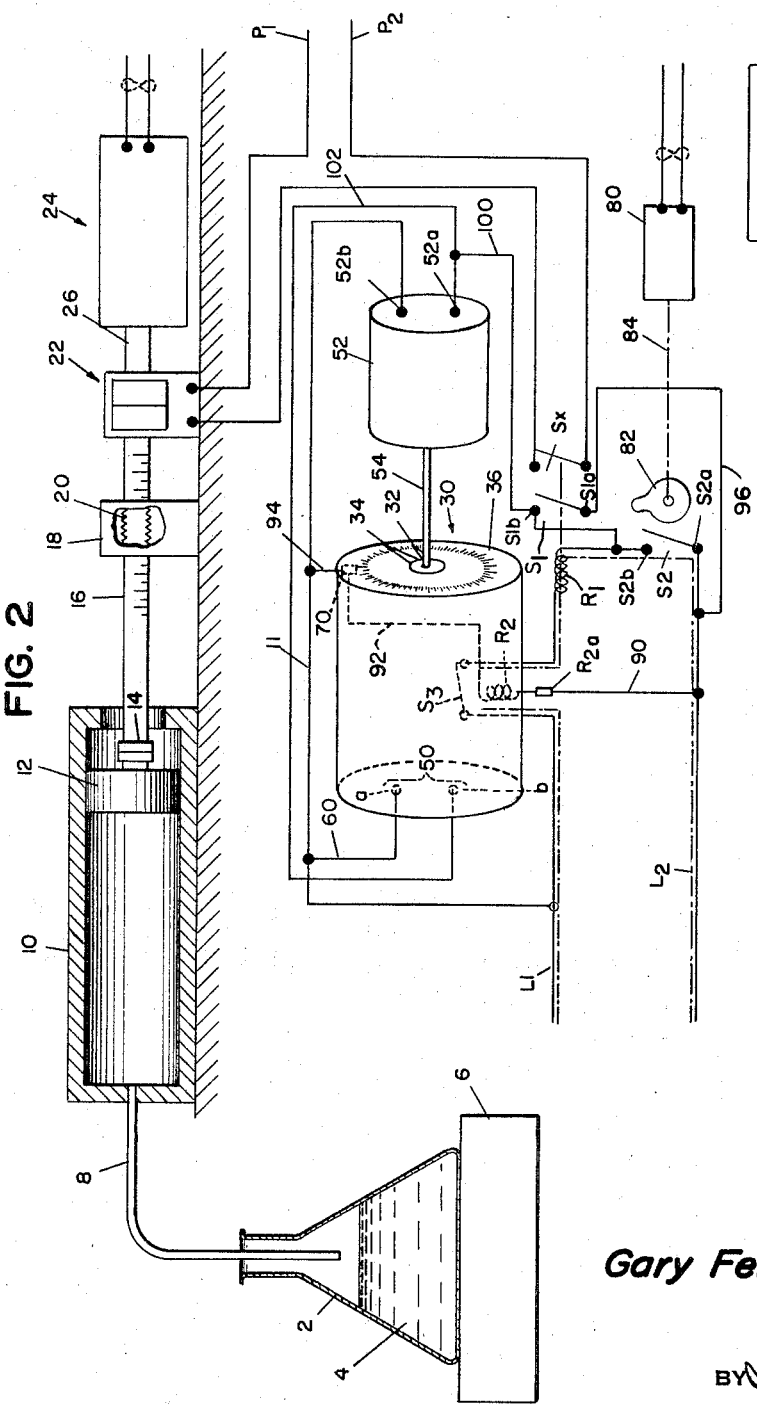
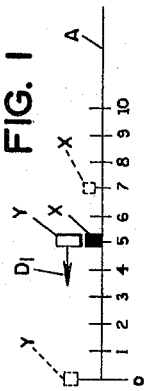
*Gary Felsenfeld*
INVENTOR
ATTORNEYS

United States Patent Office 3,342,695
Patented Sept. 19, 1967

3,342,695
EXPONENTIAL FEED METHOD AND APPARATUS
Gary Felsenfeld, Washington, D.C., assignor to the United States of America as represented by the Secretary of the Department of Health, Education, and Welfare
Filed July 14, 1964, Ser. No. 384,034
15 Claims. (Cl. 195—102)

ABSTRACT OF THE DISCLOSURE

A method and apparatus for obtaining exponentially related successive operating periods wherein first and second movable members are positioned at an initial first distance away from a given reference position. The second member is then moved toward the reference position at a constant rate while the first member is simultaneously moved away from the reference position at a constant rate less than the rate of the second member. Both members are stopped when the second member reaches the reference position, the first member having obtained a new position located at a second distance away from the given reference. The second member is then brought back to this new and greater second distance while the first member remains stationary. Both members then are again simultaneously moved, the second member towards the reference position and the first member away from same and the mode of operation is repeated. The successive periods of motion of the second member is thereby exponentially related and utilized as operating control periods for any given device.

The invention described herein may be manufactured and used by or for the Government of the United States of America for governmental purposes without the payment of any royalties thereon or therefor.

This invention relates generally to a method of, and apparatus for, controlling the times of operation of a given device. More particularly, the invention is concerned with such a method and apparatus which will automatically control a device such that successive operating periods thereof are increasingly exponentially related to one another.

The control technique and system of the invention can be employed for diverse different purposes where exponentially related operating times are desired. Still, the invention finds particular utility when employed for purposes of accurately controlling the rate of nutrient feed to bacteriological cultures, and accordingly, the invention is presented herein as used in such environment. It is to be understood, however, that a significant aspect of the invention lies in the combination of the system hereof with means for feeding nutrients, but that the invention is not necessarily so limited.

To produce certain derivatives of micro-organisms such as, in particular, repressible enzymes, it is necessary to control the amount of nutrient fed to a culture in relation to the quantity of micro-organisms therein. The micro-organisms tend to multiply at an exponential rate. For example, there may initially be ten micro-organisms in a given culture. Assuming sufficient nutrient is present in the culture, then at the end of a first given time interval, there may be one hundred micro-organisms. Again assuming that sufficient nutrient is present, at the end of the second given time period equal to the first, there would be one thousand micro-organisms. Thus, for equal increments of time, the growth rate of the organisms is exponentially related.

If the nutrient for the organisms is not present in sufficient quantity, then the organisms cannot properly "grow." On the other hand, if there is an excess of nutrient in the culture, then certain proteins, namely, the repressible enzymes, are not produced.

It is thus necessary to control the nutrient feed rate to a culture in accordance with the micro-organism growth or multiplication rate. To achieve some control, it has previously been suggested that chemically modified nutrients be used. Modified nutrients, however, only find practical application in certain special applications (e.g., it is possible to limit the growth rate of histidine requiring mutants using histidinol or N-α-formyl L-histidine). Still, since the modified nutrient techniques are limited to particular applications, they do not provide a widely usable technique which can be employed more or less universally, and particularly where exponential nutrient control is desired.

Another previously suggested technique involves the use of equipment wherein nutrients are fed to a culture at a given steady rate and the bacteria are withdrawn at a given rate. This technique and equipment do not yield exponential nurtient feed with growth in the amount of bacteria in a culture, but instead, limit the culture so that only a controlled amount of bacteria are present. Again, only a partial solution to the nutrient feed problem is obtained, at best.

There thus remains a need for a simple and efficient technique and apparatus which will exponentially control the nutrient feed to a culture, and the primary object of the present invention is to provide a method and apparatus that will satisfy such need.

More particularly, it is a primary object hereof to provide a method of adjusting successive operating times of a given device, such as a nutrient feed means, whereby the quantities of nutrients fed therefrom during successive time intervals are exponentially related. Returning to the exemplary discussion of time periods and organism growth set forth above, the following exemplary chart presents the relationship to be achieved by the method hereof.

| Time | Quantity of Bacteria | Amount of Nutrient Fed |
|---|---|---|
| 0 | 10 units | 2 units. |
| T | 100 units | 20 units. |
| 2T etc. | 1,000 units etc. | 200 units etc. |

Notwithstanding the fact that the method hereof is significant, a particular and significant object of the present invention is to provide an apparatus that will automatically carry out the method steps to achieve the exponential operations desired. In this regard, it is a further object hereof to provide such an apparatus which can be adjusted easily to permit differing quantities of nutrients to be preselected and then automatically fed to a culture in such manner that successive feeds are exponentially related to one another.

Although the preceding objects represent the main significant aspects of the invention, there are certain specific and important method objects hereof including the following: (a) the provision of a method of sequentially controlling the quantity of nutrients fed to a culture such that successive quantities are exponentially related, which method can be performed with relatively simple and comparatively inexpensive equipment; (b) the provision of such a method which can be automatically effected by using two basic moving components that essentially operate in opposite directions and at differing rates so that the operation of the fastest moving component is controlled through related operation of the second moving component to prescribe differing exponentially related successive feed intervals; and, (c) the provision of such a method which can be carried out by using commercially available clocks and/or motors, or alternatively, which can be carried out by using other more or less conventional systems such as, for example, a modified Wheatstone bridge system.

From the apparatus standpoint, additional specific and important objects hereof include the following: (a) the provision of an apparatus for exponentially controlling successive times of operation of a given device, which apparatus includes two basic driven members and control means for adjusting the position of one of the members so that the time during which the other member is driven varies exponentially in successive periods; (b) the provision of such an apparatus which comprises the combination of mechanically driven components and simple electrically responsive components so related and arranged that the driven components preset exponentially related operating periods, and the electrically responsive components automatically control the repetitive driving sequences; (c) the provision of such an apparatus in combination with means for feeding nutrients to a culture whereby the apparatus effectively controls the nutrient feed means so that successive exponentially related quantities of nutrients are dispensed from the nutrient feed means; and, (d) the provision of such an apparatus which preferably incorporates commercially available timing clock devices, but which can incorporate other control components such as variable resistances connected in a Wheatstone bridge circuit.

The invention resides in a sequence of method steps and in an automatic system which can be easily operated to effect the method steps or, in fact, to effect an exponential control of operating times for any desired device. The invention will be better understood, and objects other than those specifically set forth above will become apparent, when consideration is given to the following detailed description. Such description makes reference to the accompanying drawings presenting preferred and illustrative embodiments of the invention.

In the drawings:

FIGURE 1 is a schematic diagram presenting a scale and a pair of exemplary moving bodies which can be used to illustrate basic aspects of the method hereof;

FIGURE 2 is a schematic diagram of a system constructed in accordance herewith for carrying out the method hereof to obtain a controlled feed of nutrients to a culture; and FIGURE 3 is a schematic view of certain components of a timing control incorporated in the system of FIGURE 2.

Before referring more specifically to the drawings, consider the result which is to be obtained in accordance with the method hereof. In essence, successive operating times are desired, and these successive operating times are to be related exponentially. Thus, if T represents any given operating time and if $T_0$ represents the starting operating time, then the following relationship is desired:

$$T = T_0 e^{n/k}$$

where $n$ equals the time interval number and $k$ is a constant.

Now, consider FIGURE 1. In this figure, the axis A represents a scale of successive positions 0–10. Let it be assumed initially, that the body X is preset on position 5 and that the body Y is also preset on such position. Further, assume that the body Y is movable toward the zero reference position in the direction of arrow D1 at a constant rate R. Now, additionally assume that the body X is movable in the direction of position 10 at some fraction of rate R, e.g., $R/N$.

If the bodies X and Y are preset at position 5, and if such bodies are moved in opposite directions respectively at the rates R and $R/N$ starting at a given instance, then during the time T1 that the body Y moves from 5 to 0, the body X moves from 5 in the opposite direction by a distance equal to T $(R/N)$, such distance necessarily being less than the distance which the body Y has moved. Accordingly, and by way of example, the body X is shown in FIGURE 1 in phantom as having moved to position 7. While the body X achieved this movement, the body Y, as also indicated in phantom, has moved from 5 to 0.

The foregoing explanation of movement covers what happens during the first unit of time. Assume that at the end of the first unit of time, the body Y is moved rearwardly so that it again coincides with the position of the body X. In other words, assume that the body X reaches unit 7 during the first time interval, and assume further, that the body X stays in this position and the body Y is returned to unit 7. Now, going one step further, assume that movement of the bodies in respectively opposite directions is again started. When this movement starts, essentially the same conditions exist as during the first time interval described above. However, in this instance, the body Y travels for a longer period of time since it takes a longer time to go from 7 to 0 at the rate R than it takes to go from 5 to 0. Accordingly, during the second time interval, the body X moves further to the right on the scale of FIGURE 1 than it moved during the first interval of time. By way of example, the body X may move to position 10 in FIGURE 1 while the body Y moves from 7 to 0.

Thus, if the whole operation is repeated in the manner described above, with the bodies X and Y starting from position 10 at the start of the third time interval, the body Y again moves for a longer period before reaching 0 and the body X moves to the right by a greater distance than it moved during the preceding interval.

If body X increases its distance $R/K$ as rapidly as the rate of movement R of the body Y, then the change $dS$ in the position of the body X will be $dS = 1/K(S)$ where S is the total position from 0 to the position of body Y. If there are many successive intervals and $dS$ is small, then the following expression can be written:

$$\frac{ds}{dn} = \frac{R}{K}(s)$$

where $n$ is the interval number. Thus, $$S = S_0 e^{nR/K}$$

where $S_0$ is the starting value of S. Since the positions S are related directly to time, the required exponential time relation is achieved. The exponential constant $R/K$ can be varied by varying the rate at which the body X is driven relative to the rate R at which the body Y is driven. However, since K is fixed, the plot of log $S$ vs. $n$ presents a straight line having a fixed slope. The slope of the plot of log $S$ vs. time can be varied by varying the number of operating periods per unit time.

From the preceding discussion, it should be apparent that by moving the respective bodies or members X and Y in opposite directions and at relatively different rates, an exponential increase in movement time of the respective bodies can be obtained. The invention uses these times for control purposes. In this regard, attention is now directed to FIGURE 2.

In FIGURE 2, the numeral 2 designates a culture flask having a culture 4 therein. The flask 2 is mounted on a suitable support 6 which preferably vibrates the flask in conventional manner. Feeding to the flask 2 is a tube 8 which leads from the interior of a piston chamber 10. A piston 12 is reciprocal within the chamber 10 and the chamber 10 has walls of uniform diameter throughout its length. In essence, the piston 12 and chamber 10 form a syringe or hypodermic needle. However, the piston 12 is driven through a suitable coupling 14 by a threaded shaft 16. The shaft 16 is rotatable in a block 18 having a threaded interior bore 20. The outer end of the shaft 16 is connected to one plate or member of a magnetic clutch unit 22. The opposite plate or member of the magnetic clutch unit is driven by a motor 24 through a shaft 26.

The clutch 22, motor 24, shaft 16 and block 18 can be of any conventional design. The important factor to understand is that when the clutch 22 is operated to couple the shaft 26 with the shaft 16, the piston 12 is driven to the left as shown so as to thereby expel fluid from the chamber 10 and through the tube 8 into the flask 2. If the chamber 10 contains a culture nutrient, then when the clutch 22 is closed, the piston 12 drives nutrient through the tube 8 and to the culture 4.

The amount of nutrient so delivered to the culture depends upon the amount of rotation of the shaft 16 and accordingly upon the time during which the magnetic clutch 22 is closed. The motor 24 would run continuously, and thus when the clutch 22 is closed for a given interval of time, a prescribed amount of nutrient is delivered from the chamber 10 to the culture 4. If the clutch 22 is maintained closed for successively increasing and exponentially related, but separated time intervals, then during such successive time intervals, exponentially increasing amounts of nutrient are delivered through the tube 8 and to the flask 2.

Referring for a moment again to FIGURE 1, it will be appreciated that if the clutch 22 was controlled in accordance with the relative movement of the body Y during successive time intervals, then successively increasing and exponentially related amounts of nutrient would be delivered to the culture. In essence, this is the exact operation which is performed in accordance with the method hereof and by the apparatus hereof.

Again referring specifically to FIGURE 2, a main timer 30 is shown therein. This timer has two operating hands or arms 32 and 34. The hand 32 corresponds to the body X of FIGURE 1 and the hand 34 corresponds to the body Y of FIGURE 1. This timer or clock can be of conventional design such that the arm 32 is a preset arm which can be positioned at a predetermined reading on the scale 36 of the timer 30 to thereby establish a start setting for the arm 34. Specifically, the arm 32 can be set at a given position on the scale 36, and this would simultaneously preset the arm 34 at such starting position. In this regard, consider FIGURE 3. Here, the arm 32 is preset on the scale 36 at a starting time of 10. The arm 32 carries a stop 38 thereon. The arm 34, on the other hand, is normally urged clockwise as shown, by a spring 40 so that the arm 34 is normally maintained coincident with the arm 32 and in engagement with the stop 38 carried thereon. Accordingly, when the arm 32 is preset on the scale 10, the arm 34 would be correspondingly preset.

The arm 34, however, is driven in a counterclockwise direction by a drive assembly (not shown). This drive assembly is operated whenever power is supplied across the terminals 50 of the timer 30. In other words, when power is supplied across the terminals 50 (FIGURE 2), then notwithstanding the spring action on the arm 34, the arm 34 is driven counterclockwise and at a constant rate toward the 0 positon on the scale 36. Timers having such drive arrangements are conventional (e.g., model GTD-1M manufactured by Industrial Timer Corporation). It is thus believed unnecessary to describe the drive arrangement for the arm 34 in any detail. Additionally, it is unnecessary to describe the mounting of the arm 32, the mounting of the arm 34, or the operation of these respective arms in further detail.

Bearing in mind the above, however, it should be noted that when the arm 34 is not being driven toward the 0 position, it is free to move in the clockwise direction under the action of the spring 40 so that it again becomes coincident with the arm 32 at the end of any driving operation.

The arm 32 is normally maintained in the conventional unit at a fixed preset position, such as at position 10 on the scale 36. Thus, without the invention, after a given time operation was completed, the arm 34 would come back to its coincident position with the arm 32 and the timer 30 would be ready for a repeat operation. In contrast with the conventional operation, and consistent with the invention, the arm 32 is not maintained at its preset position. Instead, an auxiliary drive unit 52 (FIGURE 2) is incorporated, and the output shaft of this drive unit is directly coupled to the arm 32. Therefore, as the shaft 54 rotates, it drives the arm 32 clockwise. The drive unit 52 is designed to have an output speed which is only a fraction of the speed of the output of the drive unit which drives the arm 34. Accordingly, while the arm 34 is moving, for example, from the setting 10 on the scale 36 to 0, the arm 32 would move in the opposite direction but only a fraction of the distance. In essence, this operation is again like the operation described for relative movement of the bodies X and Y in the illustrative example of FIGURE 1.

Now, to understand how the timer 30 and drive unit 52 are operated, it is necessary to first consider the details of the circuit shown in FIGURE 2. The power lines L1 and L2 are leads which extend from a conventional power source (not shown). The line L1 is connected directly with one terminal of the drive unit 52 and by branch line 60 with one terminal 50a of timer 30. The power line L2, on the other hand, leads to the terimal S2a of a switch S2, to the terminal S1a of a switch S1, and to the terminal R2a of a relay R2. The terminal S2b of switch S2 is connected through the relay R1 and a switch S3 to the power line L1. The terminal S1b is connected by lead 96 with the terminal S2b and by lead 100 with the terminal 52b of the drive unit 52. The relay R2 is connected through a micro-switch 70 to the line L1. The terminal 50b is connected with the terminal 52b.

The switch S3 is closed when the relay R2 is energized and the switch S1 is closed when relay R1 is energized. Otherwise, these respective switches are open (e.g., they are biased to open position by conventional springs not shown).

The switch S2, in contrast, is closed periodically by a switch operating means. The switch operating means can take various forms but, as shown, it comprises a motor 80 which drives a cam 82 through a mechanical linkage 84 (schematically shown).

In normal operation, the relay R2 is energized since the micro-switch 70 is closed and accordingly, the coil is connected through the leads 90, 92 and 94, across the respective power lines L1 and L2. Consequently, the switch S3 is closed. All other switches in the system are open. When the cam 82 closes the switch S2, the relay R1 is connected across with the lines L1 and L2 through the switch S3. Therefore, the switch S1 is closed by the relay R1, and this serves to essentially lock the switch S1 closed since when such switch closes the relay R1 remains connected across the lines L1 and L2 through the lead 96. When the switch S1 closes, the terminals 52b and 50b are connected with the line L2 by the leads 100 and 102 respectively. At this time, the arm 34 would be coincident with the arm 32, but as soon as the switch S1 closes, the drive unit 52 starts to move the arm 32 clockwise and the drive unit for the arm 34 starts to move the arm 34 towards 0. This operation continues until the arm 34 engages the micro-switch 70. At this time, the micro-switch 70 opens, and the relay R2 is no longer connected across the lines L1 and L2. Thus, switch S3 opens. This de-energizes the relay R1 and opens the switch S1. The switch S2 is at this time also open. Accordingly, no power connection is made with the respective terminals 50b and 52b of the respective drive units. Under these circumstances, the spring 40 is free to return the arm 34 to a position coincident with the position of the arm 32 at that time. This position will be more distant from 0 than the position of the arm 32 at the start of the interval because as explained, the drive unit 52 has moved the arm 32 to its new location.

The described operation will not repeat itself and the arms 32 and 34 will remain in the new position until the cam 82 again closes the switch S2, whereupon the operation will be repeated. In this regard, it is to be understood that the cam 82 essentially sets the time at which a given interval is starting. By way of example, if the cam 82 completes a full revolution every ten minutes, then the described movement of the arms 32 and 34 will be initiated every ten minutes. Still, such movement will only last for the time necessary for the arm 34 to move from its preset position at the start of the interval to 0. The arm 34 will then return so as to be coincident with the arm 32 in the new position thereof, and the system will remain quiescent until the cam 82 again closes the switch S2.

It will be appreciated that when the arm 34 starts to return clockwise, the micro-switch 70 is no longer engaged and accordingly, the same closes. This results in energizing the relay R2 and closing the switches S3 operated thereby. Closing the switch S3 merely resets the electrical system for operation at the start of the next interval and when initiated by the cam 82.

Now, it will be noted that the switch Sx is operated simultaneously with the switch S1a. This switch S1a is only closed during the time that the arm 34 is moving from a preset position to 0 since the relay R1 is only energized from the start of a cycle initiated by the cam 82 until the arm 34 engages the micro-switch 70 at the zero position.

Switch Sx, as shown, is connected in series with the power lines P1 and P2 for the magnetic clutch 22. The clutch 22 is only supplied with power during the interval when the switch Sx is closed, and this interval has a duration corresponding to the movement times of the arm 34.

It will be understood, therefore, that the magnetic clutch 22 is closed during successively increasing time periods which are exponentially related. The piston 12 is thus driven through a greater distance in the chamber 10 during each operating period and these distances are also exponentially increased. It follows that the nutrient feed is similarly exponential.

To more fully appreciate the invention, assume again that the cam 82 completes a full rotation every ten minutes. Further assume that the arm 32 can be moved to respective settings up to one minute. By way of example, the arm 32 would initially be preset at a time of ten seconds. Accordingly, at the start of the first ten minutes, the arm 34 would be moving for a ten-second interval and the nutrient would be fed to the culture during this interval.

At the expiration of ten minutes from the start of the operation, the cam 82 would again initiate the system operation. However, at the start of this time period, the arm 32 may, for example, have been moved to the thirteen-second position. Thus, following the start of the second ten-minute period, the arm 34 would be moving for thirteen seconds and the nutrient would be fed for this thirteen-second period. There would be successively increasing settings of the arm 32, successively increasing movement times for the arm 34, and in turn, successively increasing amounts of nutrient feed. As indicated above, however, the successive periods are exponentially related.

Although the time of operation of the cam 82 can be selected as desired, the same should exceed the time of operation of the arm 34 for a maximum setting of the arm 32. Otherwise, the cam 82 would initiate action possibly in the middle of an interval during which the arm 34 was moving.

The cam 82 has been presented strictly for illustrative purposes. The invention contemplates replacing the same with an adjustable electrically operated repeating time switch such as the unit 30, but operated in a conventional manner. This modification makes the successive major time periods adjustable and more easily preset.

Bearing in mind the above described operation, it should be apparent that the invention provides a method of and apparatus for supplying successive exponentially increasing amounts of nutrient to a culture. The operation can be summarized as follows: (a) a first movable member (arm 32) is initially positioned at a first position located a first distance from a given reference position; (b) a second movable member (arm 34) is initially positioned at said first position; (c) at the end of a predetermined time interval, the second member (arm 34) is moved at a given constant rate toward said reference position while the said second member (arm 32) is moved away from said reference position at a constant rate less than said given constant rate; (d) the first and second members are stopped when the second member (arm 34) reaches said reference position whereby said first member (arm 32) is stopped at a new position; (e) the second member (arm 34) is then returned to said second position while the first member (arm 32) is maintained at the new position; (f) at the end of successive predetermined time intervals equal to the first-mentioned predetermined time interval, operations (c), (d) and (e) are repeated; and (g) nutrient is fed in constant quantities of nutrient per unit time to said culture only during movement of said second member (arm 34) toward said reference position.

Even though arms 32 and 34 have been described as movable to and from coincident positions, it will be understood that corresponding positions of the arm would be sufficient for the intended operation. Other modifications can, of course, also be made without departing from the scope and spirit of the invention.

Still, having now described the invention in considerable detail, it should be appreciated that the objects set forth at the outset of the instant specification have been successfully achieved.

What is claimed is:

1. A method of obtaining successive exponentially increasing operating time periods, said method comprising the steps of:
   (a) initially positioning a first movable member at a first position located a first distance from a given reference position;
   (b) initially positioning a second movable member at a corresponding first position located a corresponding first distance from a corresponding given reference position;
   (c) at the end of a predetermined time interval, moving said second member at a given constant rate toward said corresponding reference position while simultaneously moving said first member further away from the first mentioned reference position at a constant rate less than said given constant rate;
   (d) stopping the first and second members when said second member reaches said corresponding reference position whereby said first member is stopped at a second position;
   (e) moving said second member to a corresponding second position while maintaining said first member at said second position;
   (f) at the end of successive predetermined time intervals, equal to the first mentioned predetermined time interval, repeating steps (c), (d) and (e); and,
   (g) using the periods of movement of said second member as operating times.

2. The method defined in claim 1 wherein said first positions are coincident, said reference positions are coincident, and said second positions are coincident.

3. A method of supplying successive exponentially increasing amounts of nutrient to a culture, said method comprising the steps of:
   (a) initially positioning a first movable member at a first position located a first distance from a given reference position;
   (b) initially positioning a second movable member at a corresponding first position located a corresponding first distance from a corresponding given reference position;
   (c) at the end of a predetermined time interval, moving said second member at a given constant rate toward said corresponding reference position while simultaneously moving said first member further away from the first mentioned position at a constant rate less than said given constant rate;

(d) stopping the first and second members when said second member reaches said corresponding reference position whereby said first member is stopped at a second position;

(e) moving said second member to a corresponding second position while maintaining said first member at said second position;

(f) at the end of successive predetermined time intervals, equal to the first mentioned predetermined time interval, repeating steps (c), (d) and (e); and, (g) feeding nutrient constant quantities of nutrient per unit time to said culture only during movement of said second member toward said corresponding reference position.

4. The method defined in claim 3 wherein said first positions are coincident, said reference positions are coincident, and said second positions are coincident.

5. Control means for establishing successive exponentially increasing operating times, said control means comprising:

(a) first and second movable members, said first movable member being positionable at a first position located a first distance from a given reference position, said second movable member being positionable at a corresponding first position located a corresponding first distance from a corresponding given reference position;

(b) timing means for repetitively producing control signals at the end of predetermined equal time intervals;

(c) first drive means responsive to said signal for moving said second member at a given constant rate toward said corresponding reference position;

(d) second drive means responsive to said signal for moving said first member further away from the first-mentioned reference position at a constant rate less than said given constant rate;

(e) means for stopping the drive of said first and second members when said second member reaches said corresponding reference position whereby said first member is stopped at a second position; and, (f) means for moving said second member to a corresponding second position while said first member is at the first-mentioned second position.

6. Control means as defined in claim 5 wherein said first and second movable members are arms rotatable about the same axis, and wherein said first positions, said second positions and said reference positions for said first and second members are respectively coincident.

7. Control means as defined in claim 5 wherein said timing means comprises a sequentially operating first switch means, wherein said first and second drive means are electrically responsive, wherein said means for stopping comprises a second switch means, and wherein said control means includes circuit means having said first and second switch means connected therein for operating said drive means to move said first and second members when said first switch means is activated, and for rendering said drive means inoperative to move said first and second members when said second switch means is activated.

8. Control means as defined in claim 5 wherein said second movable member and said second drive means are part of a timing clock, wherein said first movable member is a preset arm on said clock, and wherein said first drive means comprises a motor synchronously driven with said clock.

9. Apparatus for supplying successive exponentially increasing amounts of nutrient to a culture, said apparatus comprising:

(a) first and second movable members, said first movable member being positionable at a first position located a first distance from a given reference position, said second movable member being positionable at a corresponding first position located a corresponding first distance from a corresponding given reference position;

(b) timing means for producing a control signal at the end of predetermined equal time intervals;

(c) first drive means responsive to said signal for moving said second member at a given constant rate toward said corresponding reference position;

(d) second drive means responsive to said signal for moving said first member further away from the first-mentioned reference position at a constant rate less than said given constant rate;

(e) means for stopping the driving of said first and second members when said second member reaches said corresponding reference position whereby said first member is stopped at a new position;

(f) means for moving said second member to a corresponding new position while said first member is at the first-mentioned second position; and, (g) means for feeding constant quantities of nutrient per unit time to said culture only in response to movement of said second member toward said corresponding reference position.

10. Apparatus as defined in claim 9 wherein said first and second movable members are arms rotatable about the same axis, wherein said first positions, said second positions, and said reference positions for said first and second members are respectively coincident, wherein said timing means comprises a sequentially operating first switch means, wherein said first and second drive means are electrically responsive means, wherein said means for stopping comprises a second switch means, and wherein said apparatus includes circuit means having said first and second switch means connected therein for operating said drive means to move said first and second members when said first switch means is activated and for rendering said drive means inoperative to move said first and second members when said second switch means is activated.

11. Apparatus as defined in claim 9 wherein said second member and second drive means are parts of a timing clock, wherein said first member is a preset arm for said clock, and wherein said first drive means comprises a motor driven synchronously with said first drive means.

12. Apparatus as defined in claim 11 wherein said timing means comprises a first switch means, said means for stopping comprises a second switch means, said first and second drive means are electrical, and wherein said first and second drive means and first and second switch means are connected in an electrical circuit.

13. Apparatus as defined in claim 12 wherein said electrical circuit is a power supply circuit for said first and second drive means, said first switch means closes said circuit, and said second switch means opens said circuit.

14. Apparatus as defined in claim 13 wherein said circuit includes further switch means for maintaining said circuit closed once said first switch means has closed the same, and until said second switch means opens the same without regard to the condition of said first switch means.

15. Apparatus as defined in claim 14 wherein said further switch means include solenoid operated switches.

No references cited.

ALVIN E. TANENHOLTZ, *Primary Examiner.*